（12）United States Patent
Bi et al.

(10) Patent No.: US 10,269,302 B2
(45) Date of Patent: Apr. 23, 2019

(54) CURVATURE-ADJUSTABLE DISPLAY DEVICE

(71) Applicant: BOE TECHNOLOGY GROUP CO., LTD., Beijing (CN)

(72) Inventors: Yuxin Bi, Beijing (CN); Jiyang Shao, Beijing (CN); Chengte Lai, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/508,676

(22) PCT Filed: Jul. 15, 2016

(86) PCT No.: PCT/CN2016/090094
§ 371 (c)(1),
(2) Date: Mar. 3, 2017

(87) PCT Pub. No.: WO2017/117965
PCT Pub. Date: Jul. 13, 2017

(65) Prior Publication Data
US 2018/0151130 A1    May 31, 2018

(30) Foreign Application Priority Data
Jan. 8, 2016    (CN) .......................... 2016 1 0011880

(51) Int. Cl.
*G09G 3/34* (2006.01)
*G09G 3/36* (2006.01)
(Continued)

(52) U.S. Cl.
CPC ......... *G09G 3/34* (2013.01); *G02F 1/133305* (2013.01); *G02F 1/133308* (2013.01);
(Continued)

(58) Field of Classification Search
CPC .............. G09G 3/34; G09G 2310/0264; G02F 1/133305; G02F 1/133308; G02F 1/133602
See application file for complete search history.

(56) References Cited

U.S. PATENT DOCUMENTS 9,113,553 B2 * 8/2015 An ....................... H05K 5/0217
9,224,366 B1   12/2015 Park et al.
(Continued)

FOREIGN PATENT DOCUMENTS

CN    102278973 A    12/2011
CN    103730062 A    4/2014
(Continued)

OTHER PUBLICATIONS

Office Action issued by the Chinese Patent Office dated Jul. 31, 2017.
(Continued)

*Primary Examiner* — Charles V Hicks
(74) *Attorney, Agent, or Firm* — Dilworth & Barrese, LLP.; Michael J. Musella, Esq.

(57) ABSTRACT

A curvature-adjustable display device includes: a detection module configured to detect a curvature of the display device and send the curvature; a backlight module including a plurality of backlight substructures, in which each backlight substructure is configured to provide backlight for different areas of the display device according to a backlight driving parameter matched with the backlight substructure; a driver module which is configured to receive the curvature sent by the detection module, determine the backlight driving parameter required by each backlight substructure according to the received curvature and a preset corresponding relationship between the curvature and the backlight driving parameter, and send the backlight driving parameter to each corresponding backlight substructure, respectively,
(Continued)

so that the backlight substructures can provide backlight for different areas of the display device according to the backlight driving parameter matched with the backlight substructure; and a display panel configured to display images.

11 Claims, 2 Drawing Sheets

(51) Int. Cl.
*G02F 1/1333* (2006.01)
*G02F 1/1335* (2006.01)

(52) U.S. Cl.
CPC .......... *G02F 1/133602* (2013.01); *G02F 1/133615* (2013.01); *G09G 3/342* (2013.01); *G09G 3/3611* (2013.01); *G09G 2300/0434* (2013.01); *G09G 2310/0264* (2013.01); *G09G 2320/0233* (2013.01); *G09G 2380/02* (2013.01)

(56) References Cited

U.S. PATENT DOCUMENTS

| 2016/0190216 | A1* | 6/2016 | Yang | G01B 7/18 257/91 |
| 2016/0195772 | A1* | 7/2016 | Lee | G02F 1/133611 349/61 |
| 2016/0370654 | A1 | 12/2016 | You et al. | |

FOREIGN PATENT DOCUMENTS

| CN | 104143319 A | 11/2014 |
| CN | 104166131 A | 11/2014 |
| CN | 104407352 A | 3/2015 |
| CN | 104570448 A | 4/2015 |
| CN | 104932144 A | 9/2015 |
| CN | 104977755 A | 10/2015 |
| CN | 105427761 A | 3/2016 |

OTHER PUBLICATIONS

Search Report and Written Opinion dated Oct. 10, 2016 from State Intellectual Property Office of the P.R. China.

* cited by examiner

CURVATURE-ADJUSTABLE DISPLAY DEVICE

TECHNICAL FIELD

The embodiment of the present invention relates to a curvature-adjustable display device.

BACKGROUND

Liquid crystal display (LCD) modes mainly include twisted nematic (TN), vertical alignment (VA), in-plane switching (IPS), advanced super dimension switching (ADS), etc. The ADS mode can improve the image quality of thin-film transistor liquid crystal display (TFT-LCD) products, has the advantages of high resolution, high transmittance, low power consumption, wide viewing angle, high aperture opening ratio, low color difference, non-push Mura and the like, and hence receives more and more public attention.

Curved display technology is widely applied in large-screen TV and high-end TV products. With the development of 3D technology, LCD receives more and more attention. People begin to pay attention to the display effect of LCD TV display devices. However, in a display device adopting the LCD mode (such as ADS and IPS) in which the initial alignment is the horizontal direction, when the display device is subjected to bending process, due to the influence of different bending stresses of an upper substrate and a lower substrate of the display device (the upper substrate is compressed and the lower substrate is stretched), optical axis deviation is produced between the two substrates, and hence a peripheral region of the display device will have serious problem of light leakage. In addition, a curved display is a display provided with a curved display surface. Moreover, the distance from the eyes of a viewer to various positions of the curved display is converted from being different originally into being almost the same along with the bending of the curved surface. The change of the distance may also result in brightness deviation and color deviation in a curved border area, so that the uniformity of images can be severely affected, and hence the display quality of the device can be reduced.

SUMMARY

The embodiments of the present invention provide a curvature-adjustable display device, so as to improve the display quality at different curvatures of the display device.

An embodiment of the invention provides a curvature-adjustable display device, comprising: a detection module configured to detect a curvature of the display device and send the curvature; a backlight module including a plurality of backlight substructures, in which each backlight substructure is configured to provide backlight for different areas of the display device according to a backlight driving parameter matched with the backlight substructure; a driver module which is configured to receive the curvature sent by the detection module, determine the backlight driving parameter required by each backlight substructure according to the received curvature and a preset corresponding relationship between the curvature and the backlight driving parameter, and send the backlight driving parameter to each corresponding backlight substructure, respectively, so that the backlight substructures can provide backlight for different areas of the display device according to the backlight driving parameter matched with the backlight substructure; and a display panel configured to display images.

For example, the corresponding relationship between the curvature and the backlight driving parameter is formed by acquiring a range of the backlight driving parameter required by each backlight substructure in a plurality of display devices at different curvatures, and obtaining the backlight driving parameter of a plurality of backlight substructures capable of respectively providing backlight for the same area of the plurality of display devices at each curvature.

For example, the driver module is also configured to determine a image data adjustment parameter for different areas of the display device according to the received curvature and a preset corresponding relationship between the curvature and the image data adjustment parameter of different display areas, adjust image data of different display areas according to the image data adjustment parameter, obtain adjusted image data, and send the adjusted image data; and the display panel is configured to receive the adjusted image data and achieve display according to the adjusted image data.

For example, the detection module includes a bending sensor.

For example, the bending sensor includes: a range finder disposed on a side of the display device and a reflection structure oppositely disposed on the other side of the display device.

For example, the range finder is an infrared range finder.

For example, the range finder and the reflection structure have a same distance relative to a bottom margin of the display device.

For example, the range finder includes a laser source; and light emitted from the laser source is vertically incident into a reflection center of the reflection structure.

For example, a actual distance D between both sides of the display device measured by the range finder under bending state is:

$$D = \frac{C(t2 - t1)}{2},$$

wherein C refers to light velocity; t1 refers to a first moment of the range finder emitting laser to the reflection structure; and t2 refers to a second moment of the range finder receiving the laser reflected by the reflection structure.

For example, the curvature of the display device is as follows according to the actual distance D between both sides of the display device measured by the range finder under bending state and a standard distance L between both sides of the display device under non-bending state:

$$\rho = \frac{\sqrt{4L^2 - D^2}}{LD},$$

wherein ρ refers to the curvature of the display device.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

REFERENCE NUMERALS OF THE ACCOMPANYING DRAWINGS

11—detection module; 12—backlight module; 13—driver module; 14—display; 15—memory; 111—bending sensor; 112—range finder; 113—reflection structure; 114—laser source; 131—backlight driver module; 132—image data driver module; 121—backlight substructure; 1211—light source.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In a display device adopting the LCD mode in which the initial alignment is horizontal direction, when the display device is subjected to bending process, due to the influence of different bending stresses of an upper substrate and a lower substrate of the display device (the upper substrate is compressed and the lower substrate is stretched), optical axis deviation is produced between the two substrates, and hence a peripheral region of the display device will have serious problem of light leakage. Therefore, how to overcome the phenomenon of serious light leakage in the curved display of the display device adopting the LCD mode in which the initial alignment is horizontal direction has become a problem to be solved.

Figure 1:
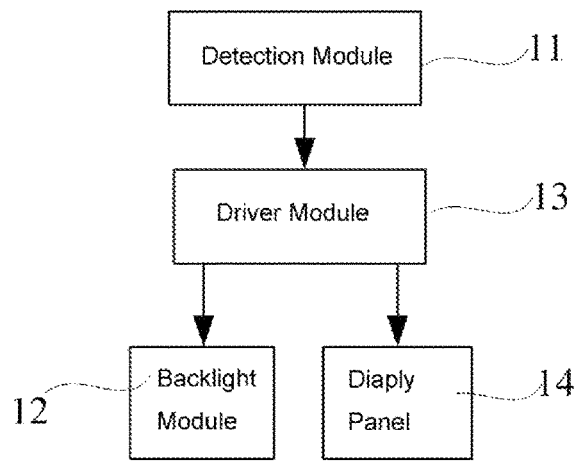
FIG. 1 is a schematic structural view of a first curvature-adjustable display device provided by the embodiment of the present invention.

The embodiment of the present invention provides a curvature-adjustable display device. As illustrated in FIG. 1, the display device comprises:

a detection module 11 configured to detect the curvature of the display device and send the curvature;

a backlight module 12 including a plurality of backlight substructures, in which each backlight substructure is configured to provide backlight for different areas of the display device according to a backlight driving parameter matched with the backlight substructure;

a driver module 13 configured to receive the curvature sent by the detection module, determine the backlight driving parameter required by each backlight substructure according to the received curvature and the preset corresponding relationship between the curvature and the backlight driving parameter, and send the backlight driving parameter to each corresponding backlight substructure, so that the backlight substructures can provide backlight for different areas of the display device according to the backlight driving parameter matched with the backlight substructure; and a display panel 14 configured to display images.

In the display device provided by the embodiment of the present invention, the curvature of the display device is detected by the detection module; the curvature is sent to the driver module; and the driver module determines the backlight driving parameter required by each backlight substructure according to the curvature and the corresponding relationship between the preset curvatures and the backlight driving parameters, and sends the backlight driving parameter to each corresponding backlight substructure respectively, so that the backlight substructures can provide backlight for different areas of the display device according to the backlight driving parameter matched with the backlight substructure. Thus, the uniformity of the entire display can be satisfied by the appropriate adjustment of the backlight brightness of different areas, and hence the serious problem of light leakage in the peripheral region of the display device due to bending process can be solved.

The curvature-adjustable display device provided by the embodiment of the present invention can improve the display quality of the display device at different curvatures.

For example, the corresponding relationship between the curvature and the backlight driving parameter is formed by acquiring the range of the backlight driving parameter required by each backlight substructure in a plurality of display devices at different curvatures, and obtaining the backlight driving parameter for a plurality of backlight substructures capable of respectively providing backlight for the same area of the plurality of display devices at each curvature.

In actual process, the backlight module 12 is divided into a plurality of areas; each area is provided with a backlight substructure; and each backlight substructure is respectively in one-to-one correspondence with different areas of the display device and configured to respectively provide backlight for different areas of the display device.

In the display device provided by the embodiment of the present invention, the curvature of the display device is detected by the detection module; the curvature is sent to the driver module; and the driver module determines the backlight driving parameter required by each backlight substructure according to the curvature and the preset corresponding relationship between the curvatures and the backlight driving parameters, and sends the backlight driving parameter to each corresponding backlight substructure respectively, so that the backlight substructures can provide backlight for different areas of the display device according to the backlight driving parameter matched with the backlight substructure. Thus, the uniformity of the entire display can be satisfied by the appropriate adjustment of the backlight brightness of different areas, and hence the serious problem of light leakage in the peripheral region of the display device due to bending process can be solved. Moreover, the backlight driving parameters in the display device are determined according to curvature, so that the applicability of the curvature-adjustable display device can be increased.

Moreover, the driver module 13 is also configured to determine image data adjustment parameter for different display areas of the display device according to the received curvature and the preset corresponding relationship between the curvature and the image data adjustment parameter for different display areas, adjust image data of different display areas according to the image data adjustment parameter, obtain the adjusted image data, and send the adjusted image data to the display.

The display panel 14 may be configured to receive the adjusted image data and achieve display according to the adjusted image data.

Along with the bending of the display device, the distance between various positions on the display device and the viewer changes as well, so color deviation may be produced at areas with large distance change. The driver module in the embodiment of the present invention determines the image data adjustment parameters of different display areas of the display device according to the received curvature and the corresponding relationship between the preset curvatures and the image data adjustment parameters of different display areas, and adjust the image data of the different display areas according to the image data adjustment parameters. Thus, the image uniformity can be better when the display achieves display according to the adjusted image data, and hence the image display quality can be further improved.

For example, when the curvature of the display device changes, the distance between the display areas near both sides of the display device and the eyes of the user has maximum change, so the viewing angle of the user may change due to the distance change, and hence the viewed color of the area will have color deviation. In order to avoid the case, images can be compensated by adjusting the image data of the area, and hence the problem of color deviation can be improved. For example, when the display areas near both sides have color deviation, the original gray value of the display areas is 220. The adjusted gray value of the display areas is determined according to the corresponding relationship between the adjusted curvature of the display device and the preset image data adjustment parameters of different display areas. For example, the adjusted gray value is 188. The color deviation is not particularly obvious by reducing the gray value, so that the objective of eliminating color deviation and further improving the image uniformity can be achieved.

Figure 2:
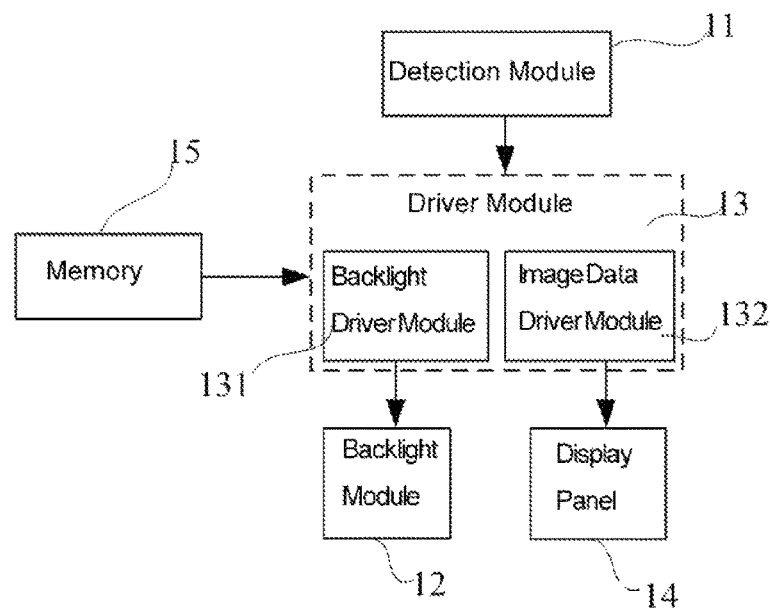
FIG. 2 is a schematic structural view of another curvature-adjustable display device provided by the embodiment of the present invention.

Moreover, as illustrated in FIG. 2, the display device may further comprise a memory 15. For example, the memory 15 is configured to store the corresponding relationship between the curvatures and the backlight driving parameters and the corresponding relationship between the curvatures and the image data adjustment parameters of different display areas.

Moreover, the driver module 13 may include a backlight driver module 131 and an image data driver module 132.

For example, the backlight driving module 131 is configured to determine the backlight driving parameter required by each backlight substructure according to the received curvature and the preset corresponding relationship between the curvatures and the backlight driving parameters, and send the backlight driving parameters to each corresponding backlight substructure respectively, so that the backlight substructures can provide backlight for different areas of the display device according to the backlight driving parameter matched with the backlight substructure.

For example, the image data driving module 132 is configured to determine the image data adjustment parameters of different display areas of the display device according to the received curvature and the preset corresponding relationship between the curvatures and the image data adjustment parameters of different display areas, adjust the image data of different display areas according to the image data adjustment parameters, obtain the adjusted image data and send the adjusted image data to the display.

Figure 3A:
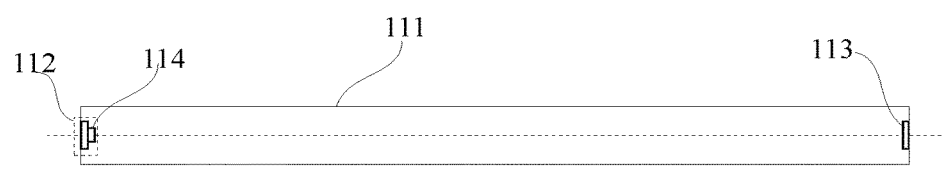
FIGS. 3a to 3c are schematic structural function diagrams of bending sensors corresponding to different curvatures.
Figure 3B:
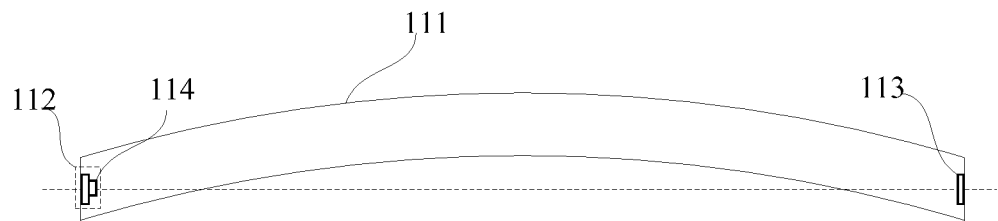
Figure 3C:
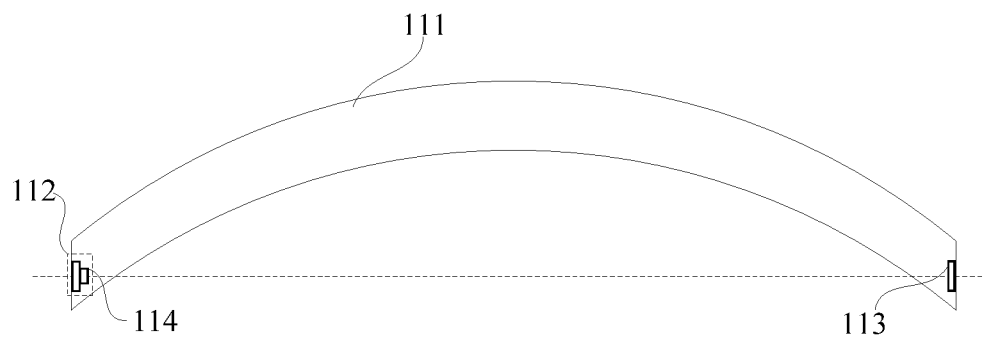

Moreover, as illustrated in FIGS. 3a to 3c, the detection module 11 may include a bending sensor 111. The bending sensor 111 may be fixed on the display device by bonding. For example, when the curvature of the display device changes, the degree of curvature and the surface resistance of the bending sensor change as well, for example, the surface resistance of the bending sensor is increased along with the increased degree of curvature. Therefore, when the surface resistance of the bending sensor changes, the bending sensor will enter the working state and detect the current curvature of the display device. For example, the variation tendency of the curvature may also be approximately determined according to the variation of the resistance of the bending sensor, so that the bending sensor will not incorrectly determine the variation tendency of the curvature due to the reasons such as computation error.

Moreover, as illustrated in FIGS. 3a to 3c, the bending sensor 111 may include:

a range finder 112 disposed on one side of the display device, and a reflection structure 113 oppositely disposed on the other side of the display device. Light emitted by the range finder is reflected to the range finder by the reflection structure 113, so that the range finder can calculate and obtain the actual linear distance of both sides of the display device according to the moment of emitting red light and the moment of receiving reflected light.

For example, the distance of the range finder 112 and the distance the reflection structure 113 relative to a bottom margin of the display device are equal.

Moreover, the range finder 112 may include a laser source 114, and light emitted from the laser source 114 is vertically incident into a reflection center of the reflection structure 113. The light emitted by the laser source 114 may be laser with specific wavelength such as infrared light and ultraviolet light and may also be laser subjected to encoding processing, so that information caused by laser beams and natural light can be distinguished, and hence the interference of the natural light or a backlight can be avoided.

Laser can only be returned to the range finder along the original path after reflection when the light emitted from the laser source is vertically incident into the reflection center of the reflection structure, so that the range finder can calculate the actual distance between both sides of the curved display device according to the time from laser emission to the receiving of reflected laser.

The curvature of the display device is as follows according to the actual distance D between both sides of the display device measured by the range finder under bending state and the standard distance L between both sides of the display device under non-bending state:

$$\rho = \frac{\sqrt{4L^2 - D^2}}{LD},$$

wherein

ρ refers to the curvature of the display device.

Description will be given below to the working principle of the curvature-adjustable display device provided by the embodiment of the present invention with reference to the above display device:

Firstly, the curvature-adjustable display device is turned on. The degree of curvature of the display device is changed within the preset curvature range according to user demands.

Secondly, when the degree of curvature of the display device changes, the detection module 11 detects that the surface resistance of the bending sensor changes, and the curvature detection function on the display device is turned on: the range finder is turned on and configured to emit infrared laser to the reflection structure, record the first moment t1 of emitting the laser, receive the infrared laser reflected by the reflection structure, and record the second moment t2 of receiving the reflected infrared laser; and the distance is calculated according to the formula $$D = \frac{C(t2 - t1)}{2}$$

on the basis of the first moment and the second moment, in which C refers to light velocity. Subsequently, the range finder obtains the adjusted curvature of the display device according to the actual distance D between both sides of the display device, the standard distance L between both sides of the display device under the non-bending state, and the computing formula of the curvature.

Thirdly, the backlight driving module 131 determines the backlight driving parameter required by each backlight substructure according to the received curvature and the preset corresponding relationship between the curvatures and the backlight driving parameters, and send the backlight driving parameters to each corresponding backlight substructure respectively, so that the backlight substructures can provide backlight for different areas of the display device according to the backlight driving parameter matched with the backlight substructure.

Moreover, the image data driving module 132 determines the image data adjustment parameters of different areas of the display device according to the received curvature and the preset corresponding relationship between the curvatures and the image data adjustment parameters of different areas, adjusts the image data of different display areas according to the image data adjustment parameters, obtains adjusted image data, and sends the adjusted image data to the display.

Fourthly, each backlight substructure provides backlight for different areas of the display device according to the backlight driving parameter matched with the backlight substructure; and the display panel 14 receives the adjusted image data and achieves display according to the adjusted image data.

In the above embodiments, the curvature of the display device is detected; the curvature is sent to the driver module; the driver module determines the backlight driving parameter required by each backlight substructure according to the curvature and the preset corresponding relationship between the curvatures and the backlight driving parameters, and sends the backlight driving parameters to each corresponding backlight substructure respectively; and the backlight substructure provides backlight for different areas of the display device according to the backlight driving parameter matched with the backlight substructure. Thus, the uniformity of the entire display can be satisfied by the appropriate adjustment of the backlight brightness of different areas, and hence the serious problem of light leakage in the peripheral region of the display device caused by bending process can be solved. Moreover, the backlight driving parameters in the display device are determined according to the curvature, so that the applicability of the curvature-adjustable display device can be increased.

Figure 4:
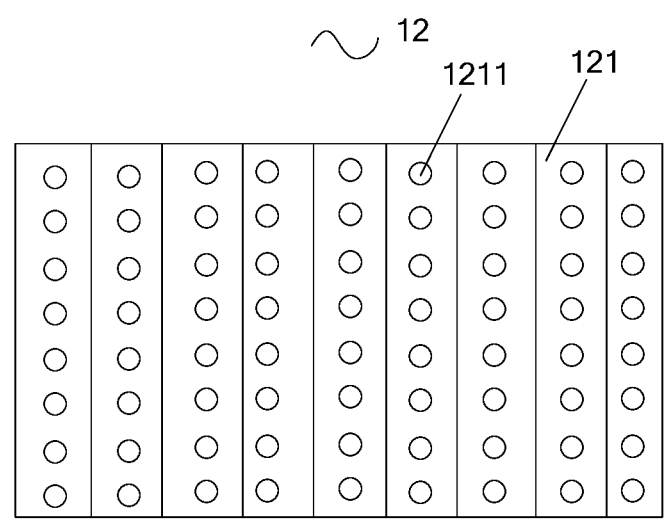
FIG. 4 is a schematic diagram of a backlight module in the curvature-adjustable display device provided by the embodiment of the present invention.

For example, the backlight module in the embodiment of the present invention includes a plurality of backlight substructures. For example, each backlight substructure includes a plurality of light sources. For example, the light sources include but not limited to light-emitting diodes (LEDs). FIG. 4 is a schematic diagram of a backlight module. The backlight module 12 includes a plurality of backlight substructures 121. Each backlight substructure 121 includes at least one light source 1211. It should be noted that the backlight substructure 121 and the light source in each backlight substructure 121 are not limited to those as shown in the figure. For example, the backlight module includes a circuit board, light sources disposed on the circuit board, a diffuser plate, etc. The circuit board, for example, includes a flexible circuit board.

For example, the driver module in the embodiment of the present invention includes a driver IC. For example, the driver IC includes but not limited to a backlight driver IC and an image data driver IC, and may also be an integrated structure. For example, the driver module in the embodiment of the present invention includes but not limited to an IC.

The curvature-adjustable display device provided by the embodiment of the present invention may further comprise one or more processors and one or more memories. The processor may process data signals and may include various computing architectures, for example, complex instruction set computer (CISC) architecture, reduced instruction set computer (RISC) architecture or one architecture for implementing multiple instruction set combinations. The memory may store instructions and/or data executed by the processor. The instructions and/or data may include codes and are configured to achieve some or all the functions of one or more devices described in the embodiment of the present invention. For example, the memory includes a dynamic random access memory (DRAM), a static random access memory (SRAM), a flash memory, an optical memory or other memories know by those skilled in the art.

In some embodiments of the present invention, the driver module includes codes and programs stored in the memory. The processor may execute the codes and the programs so as to achieve some or all the functions of the driver module as described above.

In some embodiments of the present invention, the driver module may be a hardware unit which is configured to achieve some or all the functions of the driver module as described above. For example, the driver module may be a circuit board or a combination of a plurality of circuit boards and is configured to achieve the functions as described above. In the embodiments of the present invention, the one circuit board or the combination of the plurality of circuit boards may include: (1) one or more processors; (2) one or more non-transitory computer-readable memories connected with the processors; and (3) hardware stored in the memory and capable of being executed by the processors.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201610011880.1, filed Jan. 8, 2016, the disclosure of which is incorporated herein by reference as part of the application.

The invention claimed is:

1. A curvature-adjustable display device, comprising:
   a detection module configured to detect a curvature of the display device and send data of the curvature;
   a backlight module including a plurality of backlight substructures, in which each backlight substructure is configured to provide backlight for different areas of the display device according to a backlight driving parameter matched with the backlight substructure;
   a driver module which is configured to receive the data of the curvature sent by the detection module, determine the backlight driving parameter required by each backlight substructure according to the received data of the curvature and a preset corresponding relationship between the curvature and the backlight driving parameter, and send the backlight driving parameter to each corresponding backlight substructure, respectively, so that the backlight substructures can provide backlight for different areas of the display device according to the backlight driving parameter matched with the backlight substructure; and
   a display panel configured to display images,
   wherein the bending sensor includes:
   a range finder disposed on a side of the display device and a reflection structure oppositely disposed on the other side of the display device.

2. The display device according to claim 1, wherein the range finder is an infrared range finder.

3. The display device according to claim 1, wherein the range finder and the reflection structure have a same distance relative to a bottom margin of the display device.

4. The display device according to claim 1, wherein the range finder includes a laser source; and light emitted from the laser source is vertically incident into a reflection center of the reflection structure.

5. The display device according to claim 1, wherein a actual distance D between both sides of the display device measured by the range finder under bending state is:

$$D = \frac{C(t2 - t1)}{2},$$

wherein
   C refers to light velocity; t1 refers to a first moment of the range finder emitting laser to the reflection structure; and t2 refers to a second moment of the range finder receiving the laser reflected by the reflection structure.

6. The display device according to claim 5, wherein the curvature of the display device is as follows according to the actual distance D between both sides of the display device measured by the range finder under bending state and a standard distance L between both sides of the display device under non-bending state:

$$\rho = \frac{\sqrt{4L^2 - D^2}}{LD},$$

wherein
   $\rho$ refers to the curvature of the display device.

7. The display device according to claim 1, wherein the corresponding relationship between the curvature and the backlight driving parameter is formed by acquiring a range of the backlight driving parameter required by each backlight substructure in a plurality of display devices at different curvatures, and obtaining the backlight driving parameter of a plurality of backlight substructures capable of respectively providing backlight for the same area of the plurality of display devices at each curvature.

8. The display device according to claim 1, wherein
   the driver module is also configured to determine a image data adjustment parameter for different areas of the display device according to the received curvature and a preset corresponding relationship between the curvature and the image data adjustment parameter of different display areas, adjust image data of different display areas according to the image data adjustment parameter, obtain adjusted image data, and send the adjusted image data; and
   the display panel is configured to receive the adjusted image data and achieve display according to the adjusted image data.

9. The display device according to claim 1, wherein the plurality of backlight substructures have the same size.

10. The display device according to claim 1, wherein the plurality of backlight substructures are arranged along a curved direction of the display device.

11. The display device according to claim 1, wherein the curvature is a curvature degree.

* * * * *